United States Patent [19]
Feiste et al.

[11] Patent Number: 6,070,238
[45] Date of Patent: May 30, 2000

[54] METHOD AND APPARATUS FOR DETECTING OVERLAP CONDITION BETWEEN A STORAGE INSTRUCTION AND PREVIOUSLY EXECUTED STORAGE REFERENCE INSTRUCTION

[75] Inventors: Kurt Alan Feiste; John Stephen Muhich; Steven Wayne White, all of Austin, Tex.

[73] Assignee: International Business Machines Corporation, Armonk, N.Y.

[21] Appl. No.: 08/927,889

[22] Filed: Sep. 11, 1997

[51] Int. Cl.[7] ................................................ G06F 11/28
[52] U.S. Cl. ........................ 712/217; 712/218; 712/23; 712/225
[58] Field of Search ................. 712/23, 206, 210, 712/215, 217, 218, 225; 711/126

[56] References Cited

U.S. PATENT DOCUMENTS

| | | |
|---|---|---|
| 3,602,896 | 8/1971 | Zeheb . |
| 4,156,925 | 5/1979 | Tutt et al. . |
| 4,670,836 | 6/1987 | Kubo et al. . |
| 5,467,473 | 11/1995 | Kahle et al. . |
| 5,557,763 | 9/1996 | Senter et al. . |
| 5,737,636 | 4/1998 | Caffo et al. ............................. 395/874 |
| 5,751,946 | 5/1998 | Afsar et al. ....................... 395/185.03 |
| 5,784,586 | 7/1998 | Simone et al. .......................... 395/392 |

*Primary Examiner*—Larry D. Donaghue
*Attorney, Agent, or Firm*—Anthony V. S. England

[57] ABSTRACT

One aspect of the invention relates to a super scalar processor having a memory which as addressable with respect to the combination of a page address and a page offset address, and provides a method for detecting an overlap condition between a present instruction and a previously executed instruction, the previously executed instruction being executed prior to execution of the present instruction. In one embodiment, the method comprises the steps of dividing the present instruction into a plurality of aligned memory accesses; determining the page offset for at least one of the aligned accesses; and comparing the page offset and byte count for the present instruction to a page offset and byte count for the previously executed instruction.

14 Claims, 5 Drawing Sheets

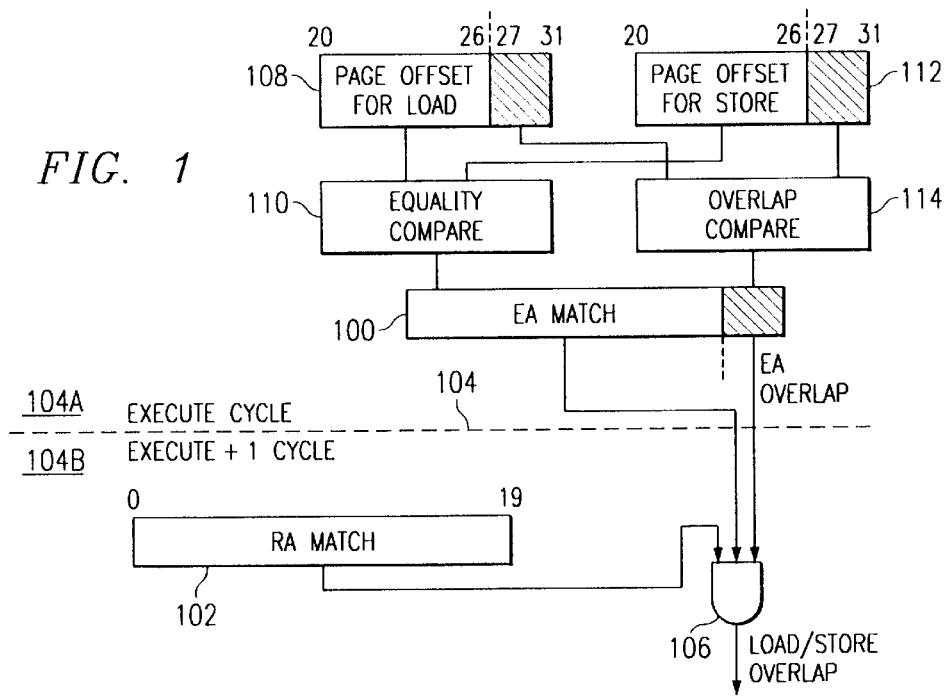
FIG. 1
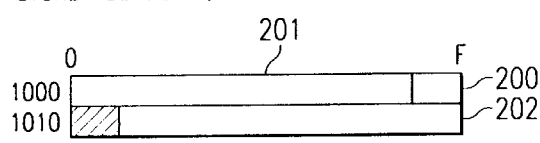
FIG. 2A STORE WORD 100E-1011
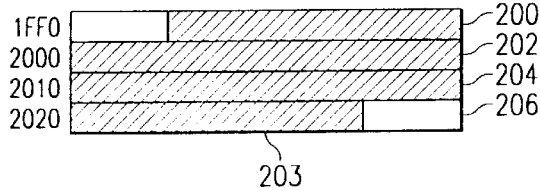
FIG. 2B STORE STRING 1FF4-202B though the load completes before the store, then the data loaded into the architectural registers of the processor by the load instruction would be invalid unless the load-hit-store occurrence is detected and corrected by flushing the load instruction and subsequent instructions, then re-executing the instructions. Load and store instructions are sometimes referred to, generally, as storage reference instructions. If a store instruction logically (i.e., in program order) follows a load, the dependencies only relate to the registers of the store instruction. If a load logically precedes a store, it must load its data before the store occurs. For both "load-hit-store" and "store-hit-load" described in the disclosure, the load instruction follows a store instruction in the program order. For a load-hit-store, the store is executed before the load, however, the store does not complete, or write its data to the cache before the load executes. In this case, the store executes prior to the load. For a store-hit-load, the load executes before the store. When it is detected that the store writes to the same location as the load, the load must be re-executed along with any instructions dependent on the load. In this case, the load executes prior to the store.

Therefore, when performing out-of-order loads and stores, it is necessary to determine if the addresses and byte lengths of the loads and stores result in an overlap of at least one byte. Moreover, it is desirable that the determination of any address overlap is made as early as possible in the instruction execute stage in order to maximize the processing speed of the processor. Further, it is desirable that the determination be made with a minimal amount of hardware in order to conserve resources on the processor and reduce design complexity.

METHOD AND APPARATUS FOR DETECTING OVERLAP CONDITION BETWEEN A STORAGE INSTRUCTION AND PREVIOUSLY EXECUTED STORAGE REFERENCE INSTRUCTION

TECHNICAL FIELD

The present invention relates generally to computer processors, and more particularly, to techniques for accessing memory in superscalar processors which allow parallel processing of instructions. More particularly still, the invention relates to techniques for quickly detecting load-hit-store and store-hit-load occurrences in superscalar processors during memory access.

BACKGROUND OF THE INVENTION

Contemporary computing systems seek to take advantage of superscalar architectures to improve processing performance. Superscalar architectures are characterized by multiple and concurrently operable execution units integrated through a plurality of registers and control mechanisms. This allows the architecture to execute multiple instructions in an out-of-order sequence, thus utilizing parallelism to increase the throughput of the system.

Although superscalar architectures provide benefits in improving processor performance, there are numerous difficulties involved in developing practical systems. An overview of some of the difficulties encountered, as well as various strategies for addressing them, are described in, for example, Johnson, et al., *Superscalar Microprocessor Design*, Prentice Hall (1991).

One problem in particular is that the control mechanism must manage dependencies among the data being concurrently processed by the multiple execution units. These dependencies arise in various ways. For example, if a load instruction is dependent on a previously issued store instruction, and the load completes before the store, then the data loaded into the architectural registers of the processor by the load instruction would be invalid unless the load-hit-store occurrence is detected and corrected by flushing the load instruction and subsequent instructions, then re-executing the instructions. Load and store instructions are sometimes referred to, generally, as storage reference instructions. If a store instruction logically (i.e., in program order) follows a load, the dependencies only relate to the registers of the store instruction. If a load logically precedes a store, it must load its data before the store occurs. For both "load-hit-store" and "store-hit-load" described in the disclosure, the load instruction follows a store instruction in the program order. For a load-hit-store, the store is executed before the load, however, the store does not complete, or write its data to the cache before the load executes. In this case, the store executes prior to the load. For a store-hit-load, the load executes before the store. When it is detected that the store writes to the same location as the load, the load must be re-executed along with any instructions dependent on the load. In this case, the load executes prior to the store.

Accordingly, it is an object of the present invention to provide techniques for addressing the above mentioned difficulties. Still further objects and advantages of the invention will be apparent to those of skill in the art in view of the following disclosure.

SUMMARY OF THE INVENTION

One aspect of the invention relates to a super scalar processor having a memory which is addressable with respect to the combination of a page address and a page offset address, and provides a method for detecting an overlap condition between a storage reference instruction and a previously executed storage reference instruction, the previously executed storage reference instruction being executed prior to execution of the storage reference instruction. In one embodiment, the method comprises the steps of dividing the memory access instruction whose operand is unaligned into a plurality of aligned accesses; determining the page offset for at least one of the aligned accesses; and comparing the page offset and byte count for the at least one aligned access to a page offset and byte count for the previously executed storage reference instruction.

Another aspect of the invention relates to an apparatus for detecting an overlap condition between a storage reference instruction and a previously executed instruction, the previously executed storage reference instruction being executed prior to execution of the storage reference instruction. In one embodiment, the apparatus comprises means for dividing the unaligned storage reference instruction into a plurality of aligned references; means for determining the page offset for at least one of the aligned references; and a means for comparing the page offset and byte count for the at least one aligned reference to a page offset and byte count for the previously executed storage reference instruction.

BRIEF DESCRIPTION OF THE DRAWINGS

FIG. 1 is a depiction of the operation of an overlap detection circuit with respect to a timeline according to an embodiment of the present invention.

DETAILED DESCRIPTION OF EMBODIMENTS OF THE INVENTION

Figure 2:
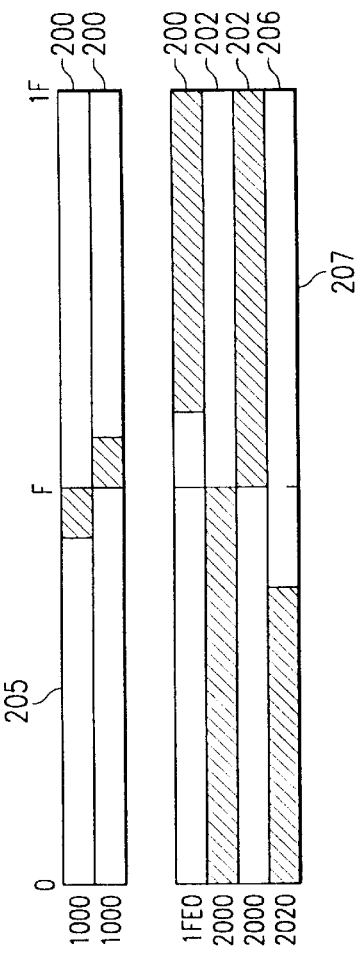
FIGS. 2A–2G illustrate how unaligned loads and stores are broken into multiple aligned loads and stores according to embodiments of the present invention.

Illustrative embodiments of the invention will be described with respect to the exemplary "POWERPC" architecture which is described in detail in various publications, such as *PowerPC Microprocessor Family: The Program-* ming Environments," available from IBM Microelectronics, and related technical support manuals. Thus, the various memory addressing modes and address translation techniques used in the "POWERPC" architecture will be familiar to those of skill in the art and will not be discussed in detail herein. Of course, it will be understood that reference to the "POWERPC" architecture is for purposes of illustration only, and the substitution of other architectures and processors in variations of the invention will be apparent to those of skill in the art.

When an instruction is issued, an "effective address" is calculated. For present purposes, an effective address ("EA") is the 64- or 32-bit sum computed by the processor when executing a memory access or branch instruction, or when fetching the next sequential instruction. Memory operands may be bytes, half words, words, or double words, or, for Load/Store multiple or string instructions, a sequence of bytes or words with the effective address space. The address of a memory operand is the address of its first byte, i.e., the lowest numbered byte. Operand length is implicit for each instruction. In the exemplary "POWERPC" architecture, some load and store string instructions have variable lengths dependent on the contents of the XER register. The "real address" as used herein refers to the physical address in memory. Accessing a page of memory requires a page address, which identifies the starting real address of a page in memory, and a page offset which identifies how many bytes into the page the instruction is to begin its access.

In practice, the effective address must be translated into a real address for the processor to access the required location in memory. The translation process involves converting the effective address into a virtual address, then converting the virtual address into the real address. These steps are described in various publications, such as the *PowerPC Microprocessor Family: The Programming Environments*, discussed previously, and will be familiar to those of skill in the art.

In order to increase the amount of memory space available to the processor, many computing systems employ a memory addressing scheme in which the total memory space is divided into blocks, referred to as pages. In the exemplary "POWERPC" architecture, the real address space is divided into 4K-byte pages which can be placed anywhere in system memory by the operating system. The operating system manages the pages of memory as they are used by the various programs running on the system.

The processor accesses a memory location in a page addressing scheme by supplying a memory address containing a page number and page offset to the memory controller. The page number, also referred to herein as the page address, identifies the starting location in real memory of the 4K-byte page. The page offset identifies how many bytes into the page the desired memory location is located. In the illustrative "POWERPC" architecture, the real address is a 32-bit value, with the most significant 20-bits being the page address and the lower 12-bits being the page offset.

In order for caching schemes to operate, the cache memory must be divided into blocks, referred to as cache lines, of a consistent size for particular types of accesses. This allows the individual lines to be tagged for access and look-up by the processor. The exact type of caching scheme is not critical and any of numerous conventional caching schemes may be employed with the invention as a matter of design choice. For purposes of illustration, a cache line contains 32-bytes, and provides a 32-byte boundary for single cycle load accesses and a 16-byte boundary for single cycle store accesses. If an instruction requires a memory element, such as a word, which spans a cache boundary in real memory, then the processor must perform two accesses, one on each side of the boundary. An instruction which requires an access which spans a cache boundary is referred to as an "unaligned" instruction. Overlap detection is more difficult for unaligned instructions than for aligned instructions.

For aligned instructions, e.g., loads and stores, overlap detection is performed across two clock cycles. During the execute cycle of an instruction, the effective address of the instruction is calculated. During the same cycle, the page offset of the instruction is compared for overlap with the page offset addresses of previously executed load or store instructions. In the following cycle, after address translation, the page address of the instruction is compared with the page addresses of previously executed load or store instructions. The 20-bit page address comparison is a simple equality comparison between the address of the instruction in the execution pipeline and the previously executed instructions. This equality comparison is, of course, much simpler to perform and requires fewer hardware gates than the more complex overlap comparison performed on the page offset addresses.

If a load instruction is currently in the execution pipeline, i.e., the load instruction is the present instruction, the processor compares the address of the load instruction to the addresses of the store instructions (i.e., previously executed instructions) in the store address queue which contains the target addresses of the store instructions which have been executed but whose data has not been stored into memory. Similarly, for a store instruction in the execution pipeline, the processor compares the address of the store to the target address of the load instructions saved in the preload queue. Loads are placed in the preload queue when they have been executed before a preceding store instruction.

Unaligned load instructions which cross 32-byte boundaries are first broken into multiple 32-byte aligned loads which access separate lines of the cache. The load-hit-store detection of the unaligned load is performed as though the load were two (or more) aligned loads for overlap comparisons. For stores which cross a 16-byte boundary, the stores are broken into multiple 16-byte aligned stores when entered into the store address queue. The store-hit-load detection of the store is also performed as though the store were a number of aligned stores. The store-hit-load detection logic exploits the fact that neither piece of the unaligned load or store crosses a 32-byte boundary. This will be described in greater detail herein.

In one embodiment, the load-hit-store logic compares a load in the processor's instruction execute stage with all older stores in the store address queue. The stores in the store address queue are available at the beginning of the processor's instruction execute cycle, while the load address is not fully computed until the cycle is nearly complete. Therefore, according to the present invention, the overlap comparators are optimized to reduce the logic delay of the load address through the overlap comparators.

The store-hit-load logic compares a store in the processor's execute stage with all younger loads in the preload queue. When the store executes, if it is discovered that the store address overlaps with a load which has been executed out-of-order with respect to the store, then the load must be retried. The load addresses in the preload queue are available at the beginning of the execute cycle, while the store address in execute does not finish computation until the cycle is nearly complete. The overlap comparators used in the pre-load queue are also optimized to reduce the logic delay of the store address in execute. This approach advantageously optimizes the performance of load and store overlap comparisons as will be more fully described herein.

In one advantageous version of the invention, page offset addresses are compared for overlap before address translation completes. More specifically, effective address calculation completes early in the execute cycle, typically about halfway through, while the real address translation does not complete until the end of the execute cycle. Also, it will be noted that, in one embodiment of the invention, the lower 12-bits of the effective address is the page offset. These bits remain unchanged during the translation sequence from the effective to virtual to the real address. Although the page addresses of loads and stores are not compared until the cycle after execute, the time required to detect a load-hit-store or store-hit-load condition may be minimized by comparing the overlap of the page offsets during the execute cycle for the instruction. In this way, in the cycle after execute, only an equality comparison need be performed on the page addresses.

By aligning the loads and stores on 32-byte cache boundaries, only the lower 5-bits of the effective address are used in the overlap comparison, the remaining 27-bits in the address can be tested for overlap with a simple equality comparison. This is illustrated in greater detail with respect to FIG. 1. FIG. 1 depicts the operation of an overlap detection circuit with respect to a timeline 104 according to an embodiment of the invention. In one embodiment, the least significant 12-bits of the effective address from a present instruction in the execution pipeline 108 are compared with an address of a previously executed instruction from the store queue 112 and the results of the comparison are written to register 100. More particularly, bits 20–26 of the page offset for the load and bits 20–26 of the page offset for the relevant store instructions from the store queue 112 are provided to equality comparison circuit 110. The results of the comparison are used to set, or reset, a bit in register 100 which determines whether there is a match between the page offsets. At the same time, bits 27–31 of the page offset of the load and for the store are provided to overlap comparison circuit 114. The results of the overlap comparison are used to set a bit in register 100 to indicate whether there is an overlap. As shown, this occurs during the execute cycle 104a.

In the following cycle, the real address of the instruction is compared with similar address data from the store queue. The results of this comparison are written to register 102. If the comparison indicates that either (1) the load address is less than the difference between the store starting address and the load length, or (2) the load address is greater than the store start address plus the store length, then no overlap is present and the overlap detection circuit will allow the instructions to execute to completion. However, if the comparison does not yield one of these conditions, then the page addresses must be checked in the next cycle to determine if an overlap exception need be generated. The results of both comparisons are passed to an AND gate 106, which generates an output signal indicating whether an overlap exists.

Detecting overlap between two addresses which are unaligned requires full carry propagating adders over the entire width of the addresses. However, the amount of circuitry required for overlap detection in the present invention is reduced by dividing unaligned loads and stores into multiple aligned loads and stores, without performance penalty to the processor. More specifically, performing unaligned memory operations typically requires multiple cycles of the clock to access the cache or the memory buses, thus, the present invention performs overlap comparison across multiple cycles without additional delay. Also, since the loads and stores are broken into 32-byte and 16-byte aligned loads and stores, respectively, the overlap detection circuits are only required to consider the bottom 5-bits of the effective address. The upper 27-bits (59 bits for 64 bit real addressing mode) of loads and stores can be compared using an equality comparison since all memory operations are broken into pieces whose address space is guaranteed not to spill over into the next 32-byte boundary.

FIGS. 2A–2G illustrate how loads and stores are broken into multiple aligned loads and stores. Those of skill in the art will appreciate that while stores are broken into 16-byte quantities, overlap detection circuitry works on 32-byte boundaries since loads are broken into 32-byte quantities.

In FIGS. 2A–2B, there is shown a portion of an address space 201 which is divided into 16-byte boundaries. The address space 201 has two adjacent lines 200 and 202. Line 200 is located at address 0×1000 and line 202 is located at address 0×1010. A store instruction which accesses memory locations 0×100E–0×1011 is executed. This is an unaligned instruction since it crosses the 16-byte boundary of address space 201. Two accesses to address space 201 are required. FIG. 2B is also an unaligned instruction which crosses a 16-byte boundary address space. In this case, the instruction is a store string which accesses memory locations 0×1FF4—0×202B in address space 203 as shown.

FIG. 2C shows the same instruction depicted in FIG. 2A, but aligned on a 32-byte boundary address space 205. However, according to this version of the present invention, two accesses to cache 205 are still used to store the data into line 200. FIG. 2D illustrates the execution of a store string instruction, accessing locations 0×1FF4–0×202B, with respect to the 32-byte address space 207. Note that in address space 207, two accesses are directed to line 0×2000.

Similarly, FIGS. 2E–2G illustrate accesses to address spaces 209, 211 and 213 by various load instructions. In FIG. 2E, address space 209 is accessed by load word 0×101E–0×1021. This is an unaligned instruction which requires data from lines 200 and 202 in address space 209. Two accesses are required. In FIG. 2F, instruction load word 0×100E–0×1011 is an aligned instruction and only one access to line 200, located at 0×1000 of address space 211, is required. Finally, as depicted in FIG. 2G, the load string instruction 0×1FE4–0×2055 requires access to lines 202, 204, 206 and 208 of address space 213.

The overlap detection may be further optimized in other embodiments of the invention by taking advantage of the fact that the size of an instruction can normally be determined at the decoding stage. For example, the load and store sizes of instructions can be determined during instruction decode for most loads and stores in the POWERPC architecture. Load and store string lengths are determined from a value derived by the XER register. The XER register is a 32-bit user-level register. The load and store string size is generally available from the XER register early in the processor's instruction execute stage.

Figure 3:
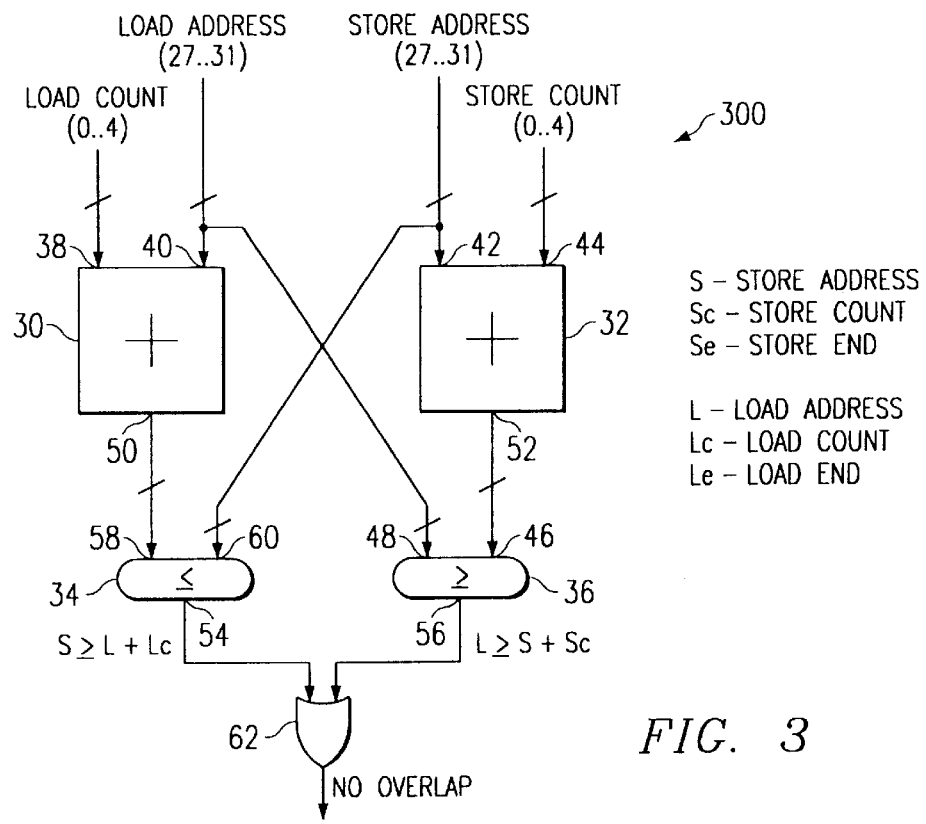
FIG. 3 is a schematic diagram of an overlap detection circuit which detects whether a load address and a store address overlaps within a 32-byte range according to an embodiment of the present invention.

With this in mind, and referring now to FIG. 3, there is shown a schematic diagram of a circuit which detects whether a load address and store address overlaps within a 32-byte range according to an embodiment of the invention. In this case, the circuit 300 includes a pair of adders 30 and 32. Adder 30 has a first input 40 for receiving the load address, which, in this embodiment, includes bits 27–31 of the page offset of the effective address. Adder 30 also has a second input 38 for receiving the load count, i.e., the number of bytes which are to be loaded by the load instruction. Adder 32 similarly has input 42 for receiving the store address and input 44 for receiving the store count.

Output 50 of adder 30 is coupled to input 58 of comparator 34, and the store address is coupled to input 60 of comparator 34. Similarly, comparator 36 has an input 46 for receiving the output 52 of adder 32, and input 48 for receiving the load address. Outputs 54 and 56 of comparators 34 and 36, respectively, are provided to the inputs of OR gate 62 which ORs the respective output signals together to indicate whether an overlap condition is detected. Specifically, the circuit 300 will indicate there is no overlap if either of two conditions are met: (1) if the load address is greater than or equal to the store end address (i.e., the store address+the store count), or (2) if the store address is greater than or equal to the load end address (i.e., the load address+ the load count).

This is illustrated mathematically by the following two true/false equations:

$$L \geq S+Sc \quad (1)$$

$$S \geq L+Lc \quad (2)$$

where L is the lower 5 bits of the effective address of the load, S is the lower 5 bits of the effective address of the store, Lc is the byte count of the load instruction and Sc is the byte count of the store instruction.

Figure 3A:
FIGS. 3A–3D are a set of line diagrams for determining whether various conditions will cause the overlap detection circuit of FIG. 3 to indicate an overlap may exist.
Figure 3B:

Referring now to FIGS. 3A–3B, there is shown a plurality of line diagrams illustrating the operation of the circuit 300. FIG. 3A illustrates the condition in which the conditions "L≧S+Sc" and "S≧L+Lc" are false. In this case there is clearly a possible overlap of the instructions. FIG. 3B also indicates there is a possible overlap condition. In this case, the same conditions shown in 3A are met, but, in this case, the page offset address of the store instruction is lower in memory than the page address of the load instruction.

Figure 3C:
Figure 3D:

FIGS. 3C and 3D illustrate the situation in which there is no overlap between the load and store instructions. In FIG. 3C, the end of the store instruction, Se, is lower in memory than the load page address L. Thus, the condition S≧L+Lc is false, but the condition L≧S+Sc is true. By contrast, the end of the load instruction occurs before the beginning of the store instruction in memory. thus, the condition L≧S+Sc is false, but the condition S≧L+Lc is true and, accordingly, there is no overlap regardless of page address.

Figure 4:
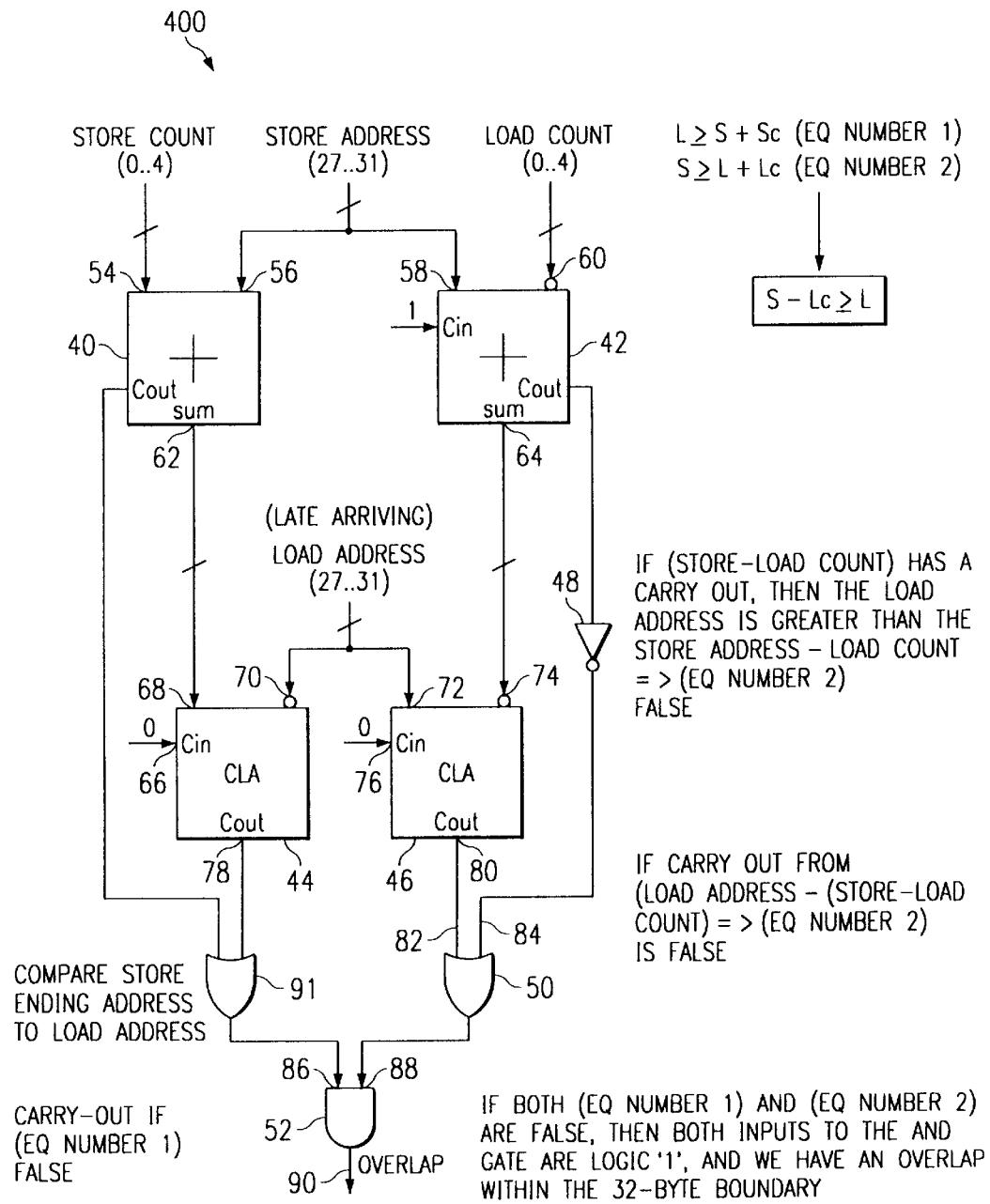
FIG. 4 is a schematic diagram of an overlap detection circuit optimized to minimize delay between the load starting address and the circuit output by subtracting the load size from the store address.

As mentioned above, when detecting load-hit-store, the load address in execute is generated and becomes available in the second half of the cycle, whereas the store address is available from the store address queue from the beginning of the cycle. Referring now to FIG. 4, there is shown a circuit optimized to minimize the delay from the load starting address to the circuit output. In this case, rather than performing a comparison to determine whether the store start address is greater than, or equal to, the load ending address, the circuit subtracts the load length from the store starting address since both of these quantities are available at the beginning of the execute cycle.

Here, the circuit 400 includes a pair of adders 40 and 42. Adder 40 has a first input 54 for receiving the store count. Adder 40 also has a second input 56 for receiving the store address. Likewise, adder 42 has an input 58 for receiving the store address from the store address queue, and an input 60 for receiving the load count. The load count is inverted at input 60 so that the output of adder 42 is effectively the difference between the load count and the store address received at input 38. Thus, the output of adder 42 effectively manipulates the variables in equation (2) to provide an output reflective of S-Lc. From this it is seen that if S-Lc has a carry out, then the load address is greater than the store address minus the load count, and thus equation (2) is false. The carry out is passed through inverter 48 to OR gate 50 which provides a signal to the input 88 of AND gate 52. The adder 42 also has output 64 which is provided to carry look-ahead adder, or CLA, (which in this case is used as a comparator) 46 through inverting input 74. This is compared with the load address received at input 72 and the resulting signal is passed to input 82 of OR gate 50.

Output 62 of adder 40 is coupled to input 68 of comparator 44. Adder 40 also has a carryout signal Cout which is provided to one input of OR gate 91. Comparator 44 (also implemented as a CLA in this embodiment) has an inverting input 70 for receiving the load address. Comparator 44 is also provided with an output 78 coupled to the second input of OR gate 91. The output of OR gate 91 is coupled to input 86 of AND gate 52. Comparator 44 compares the store end address, i.e., the sum of the store count and the store address, with the inverted load address. If the comparison results in a carry out, then equation (1) is false. If both equations (1) and (2) are false, then both inputs to AND gate 52 are high, indicating an overlap within the 32-byte boundary. The operation of the circuit 400 will be described in greater detail with respect to Figures 5A–5D.

Figures 5A, 5B, 5C, 5D:
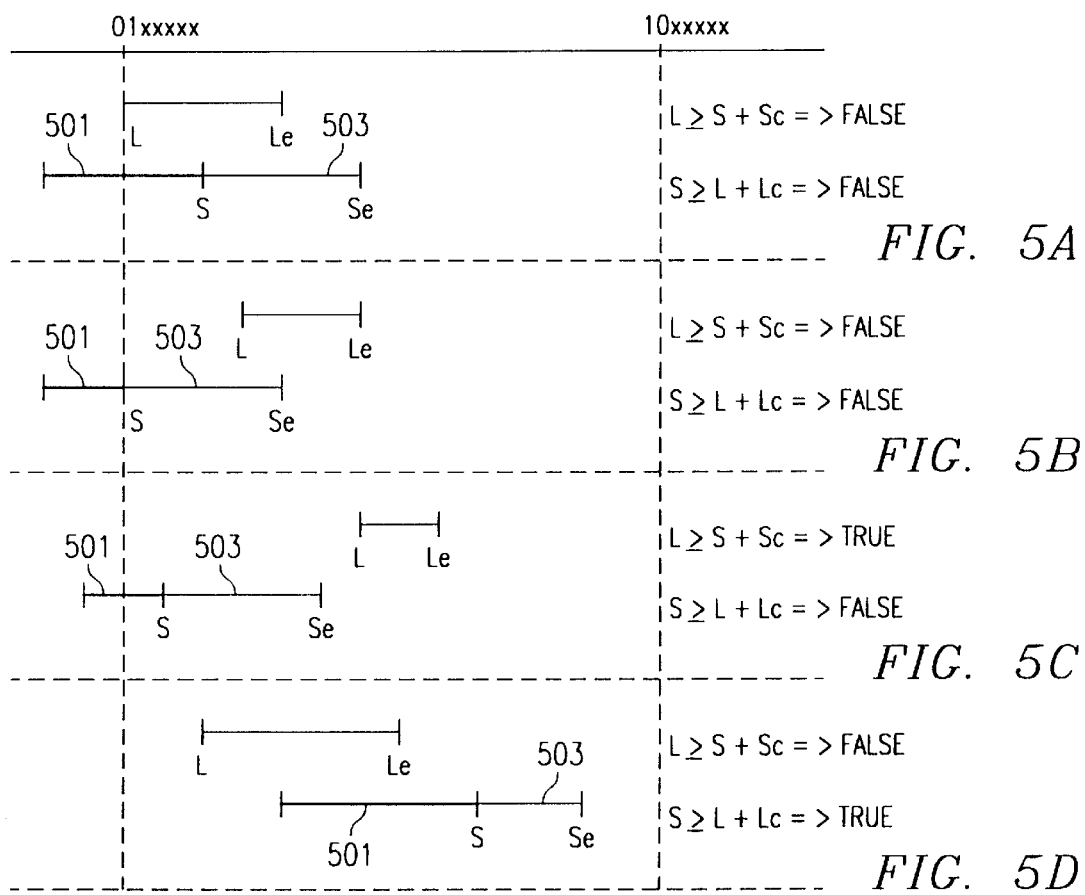
FIGS. 5A–5D are a set of line diagrams for determining whether various conditions will cause the overlap detection circuit of FIG. 4 to indicate an overlap may exist, and which illustrates the meaning of subtracting the load size from the store address.

FIGS. 5A–5D are line diagrams which indicate the true/false conditions of equations (1) and (2) for various input conditions. Also, in FIGS. 5A–5D, it will be noted that the difference S-Lc is indicated by the segment 501, while S+Sc is indicated by the segment 503. FIGS. 5A and 5B graphically illustrate conditions in which equations (1) and (2) are both false, indicating a possible overlap condition exists between the load and store instructions. In these cases, the page address must be checked in the following cycle to determine whether a load-hit-store or store-hit-load condition exists. In FIGS. 5C and 5D, at least one of equations (1) or (2) is false, indicating there is no possibility of an overlap, regardless of what page in real memory the respective store and load instructions address reside.

Similarly, for determining store-hit-preload conditions, the store address in execute is again generated late in the cycle, whereas the load address is available from the beginning of the cycle from the preload queue. A circuit optimized to minimize the delay from the store address to the output of the overlap detect circuit may be formed by merely swapping the load and store inputs in the circuit of FIG. 4. In this case, however, if the store address is less than or equal to the difference between the load address and the store length, and if the store address is greater than the load end address (i.e., the load address plus the load count), then no overlap exists. However, if any other condition is determined, then generation of an exception may be necessary. It will be noted that, under some conditions, it is possible that a storage reference instruction will load, or store, a byte count of 0. In this case, the load and stores are discarded, and not supplied to the comparison circuit showed in FIG. 4.

Although the present invention has been described with respect to the above illustrative embodiments, it will be clear to those of skill in the art that various changes in form and detail are possible without departing from the scope and spirit of the invention. All documents described herein are hereby incorporated by reference as if set forth in full.

What is claimed is:

1. In a super scalar processor having a memory which is addressable with respect to the combination of a page address and a page offset address, a method for detecting an overlap condition between a present storage reference instruction and a previously executed storage reference instruction, the previously executed instruction being executed prior to execution of the present instruction, the method comprising:

(a) determining the page offset and byte count for the present instruction;

(b) in a first processing cycle, comparing the page offset and byte count for the present instruction to a page offset and byte count for the previously executed instruction;

(c) determining the page address for the present instruction; and (d) comparing the page address for the present instruction to a page address for the previously executed instruction in a processing cycle after the first processing cycle.

2. A method as in claim 1 wherein the present instruction is associated with an effective address during the first processing cycle.

3. A method as in claim 2 wherein the effective address of the present instruction is translated into a real address during the first processing cycle, the real address comprising the page address and page offset address for the present instruction.

4. A method as in claim 3 wherein the step of determining the page offset and byte count for the present instruction includes determining the page offset for the present instruction from the effective address of the present instruction before the effective address is translated into the real address.

5. The method as in claim 1 wherein comparing the page offset and byte count for the present instruction to the page offset and byte count for the previously executed instruction comprises subtracting the byte count of the present instruction from the page offset of the previously executed instruction and determining whether the difference is greater than, or equal to, the page offset of the present instruction.

6. A method as in claim 1 wherein comparing the page offset and byte count for the present instruction to the page offset and byte count for the previously executed instruction comprises adding the byte count of the previously executed instruction to the page offset of the previously executed instruction and determining whether the sum is greater than, or equal to, the page offset of the present instruction.

7. In a super scalar processor having a memory which is addressable with respect to the combination of a page address and a page offset address, an apparatus for detecting an overlap condition between a present storage reference instruction and a previously executed storage reference instruction which has been executed prior to execution of the present storage instruction, the apparatus comprising:

(a) means for determining the page offset and byte count for the present instruction;

(b) means for comparing the page offset and byte count for the present instruction to a page offset and byte count for the previously executed instruction, said comparison being performed in a first processing cycle;

(c) means for determining the page address for the present instruction; and (d) means for comparing the page address for the present instruction to a page address for the previously executed instruction in a processing cycle after the first processing cycle.

8. An apparatus as in claim 7 further comprising means for associating the present instruction with an effective address during the first processing cycle.

9. An apparatus as in claim 8 further comprising means for translating the effective address of the present instruction in to a real address including a page address for the present instruction.

10. An apparatus as in claim 9 wherein the means for comparing the page offset and byte count for the present instruction to a page offset and byte count for the previously executed instruction performs the comparison before the effective address of the present instruction is translated to the real address for the instruction.

11. An apparatus as in claim 7 wherein the means for comparing the page offset and byte count for the present instruction to a page offset and byte count for the previously executed instruction comprises means for subtracting a byte count of the present instruction from the page offset of the previously executed instruction and determining whether the difference is greater than, or equal to, the page offset of the present instruction.

12. An apparatus as in claim 7 wherein the means for comparing the page offset and byte count for the present instruction to the page offset and byte count for the previously executed instruction comprises means for adding the byte count of the previously executed instruction to the page offset of the previously executed instruction and determining whether the sum is greater than, or equal to, the page offset of the present instruction.

13. In a super scalar processor having a memory which is addressable with respect to the combination of a page address and a page offset address, a method for detecting an overlap condition between a present storage reference instruction and a previously executed storage reference instruction, the previously executed instruction being executed prior to execution of the present instruction, the method comprising:

(a) determining the page offset and byte count for the present instruction from the effective address for the present instruction;

(b) comparing the page offset and byte count for the present instruction to a page offset and byte count for the previously executed instruction;

(c) determining the page address for the present instruction after the effective address for the present instruction has been converted to a real address; and (d) comparing the page address for the present instruction to a page address for the previously executed instruction after the comparison of the page offset and byte count for the present instruction to the page offset and byte count for the previously executed instruction.

14. The method of claim 13 wherein:

(a) the step of comparing the page offset and byte count for the present instruction to the page offset and byte count for the previously executed instruction is performed in a first processing cycle; and (b) the step of comparing the page address for the present instruction to the page address for the previously executed instruction is performed in a processing cycle after the first processing cycle.

* * * * *